Sept. 30, 1952 W. T. REA 2,612,560
ELECTRONIC TELEGRAPH HUB TYPE REPEATER
Filed Aug. 31, 1949
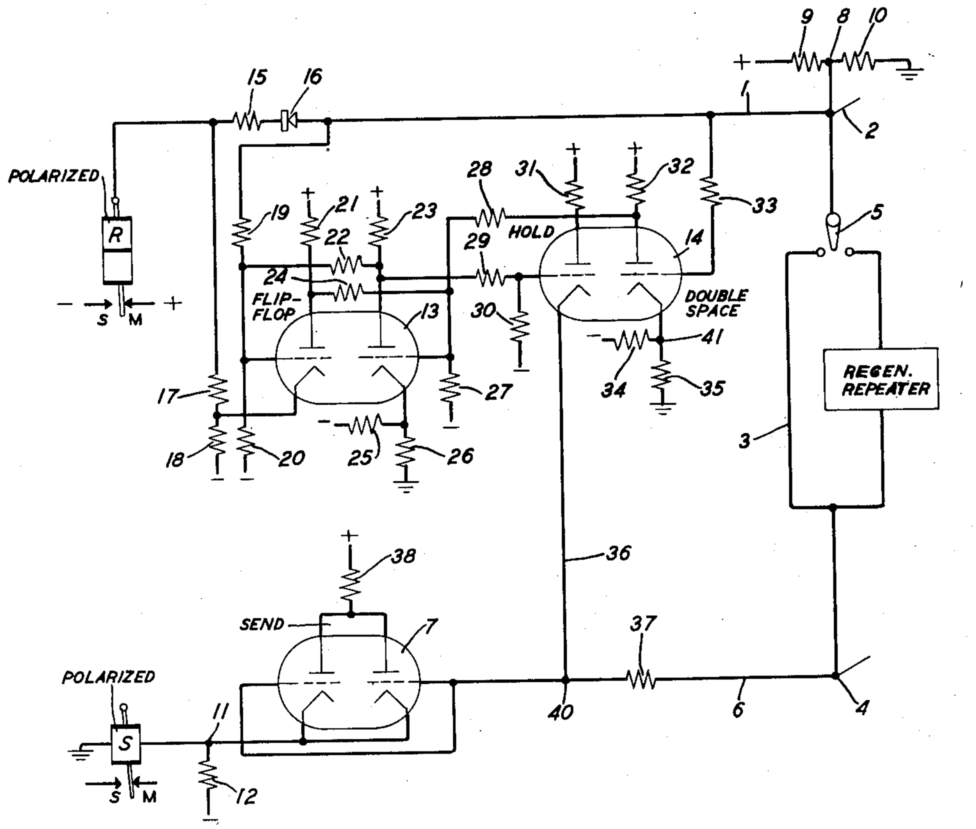
INVENTOR
W. T. REA
BY John E. Cassidy
ATTORNEY Patented Sept. 30, 1952

2,612,560

UNITED STATES PATENT OFFICE 2,612,560

ELECTRONIC TELEGRAPH HUB TYPE REPEATER

Wilton T. Rea, Manhasset, N. Y., assignor to Bell Telephone Laboratories, Incorporated, New York, N. Y., a corporation of New York Application August 31, 1949, Serial No. 113,420

5 Claims. (Cl. 178—73)

This invention is an improved hub telegraph repeater of the type having a control circuit employing space discharge devices. Hub telegraph repeater circuits are well known in the art being described for instance in Patent 2,056,277 issued October 3, 1946, to F. S. Kinkead, Patent 2,069,224 issued February 2, 1937, to G. C. Cummings, and Patent 2,392,339 issued January 8, 1946, to W. T. Rea, the inventor of the present arrangement. The improvement consists in an arrangement wherein the control circuit hold function is performed by the cathode circuit of the hold tube. This affords the advantage that the cathode circuit of the hold tube presents substantially an open circuit when the hold tube is inactivated for the released condition of the hold circuit. As a result of this, signals impressed from the hub on each of the sending legs connected into the hub concentration whose control circuits are in the released condition are not attenuated as is the case when the sending legs are shunted by conducting paths through the hold tube circuits.

An object of the invention is the improvement of hub telegraph repeater circuits and more particularly such circuits having control circuits employing space discharge devices.

A feature of the invention is a control circuit having a hold tube which is substantially in the open circuit condition when the hold condition is released, to permit the transmission of signals through the sending leg, thus preventing the shunting of the sending legs in a hub repeater concentration, when signals are transmitted through them from the hub.

The invention may be understood from the following description when read with reference to the associated drawing in which a preferred form of the invention is presently incorporated, although it is to be understood that the invention may take other forms which will be readily suggested by the following to those skilled in the art.

First, in general, the drawing shows at the upper left a polar telegraph receiving relay R by means of which telegraph signals generated at a distant telegraph repeater may be impressed through the receiving leg 1 on the receiving hub 2. A plurality of receiving legs, individual to other repeaters and indicated by the single strap are connected to the hub 2. Ten or twenty or more or less may be so interconnected to the receiving hub 2. The receiving hub 2 is connected, depending upon whether or not regeneration is required, either through the regenerative repeater or the branch 3, according to the position of the switch 5, to the sending hub 4. From the sending hub 4, the sending leg 6 extends through resistance 37 and the double triode send tube 7 to the polar telegraph sending relay S by means of which signals from the receiving legs of other repeaters may be transmitted to the distant telegraph repeater. The sending legs individual to the other hub telegraph repeaters are connected to the sending hub 4 and are represented by the single strap connected thereto.

The apparatus shown in the drawing between the receiving leg 1 and the sending leg 6, and to the left of the hub, is an electronic control circuit, one of which is individual to each hub repeater connected into a hub concentration. The functions of this circuit in each hub repeater are: 1, to prevent transmission back through the sending leg of a repeater when signals are incoming to the hub from the receiving leg of the same repeater; and 2, to provide an indication that more than one repeater is attempting to transmit through the hub simultaneously, which is an abnormal condition known as a double space or, more strictly, a plural space condition.

For the marking condition and idle condition the receiving relay R and the sending relay S in each hub repeater connected into the hub concentration assume the condition as shown on the drawing with the armature of each engaging its right-hand or marking contact.

If now one of the distant repeaters starts to send toward the hub through its associated hub repeater, in response to each spacing signal element the armature of receiving relay R in the associated hub repeater will be actuated to engage its spacing contact S. The spacing signal will be propagated through the hub and the sending legs and sending relay S of each hub repeater, other than the hub repeater through which the spacing signal is being received, to all other distant repeaters in the system. The sending relay in the individual hub repeater from which the spacing signal is being received, however, will be maintained in the marking condition. This is the normal communicating condition.

For the abnormal condition if more than one distant repeater transmits simultaneously, so that more than one R relay is actuated and more than one spacing signal is impressed on receiving hub 2, all sending relays, including those associated with the receiving relays in the individual hub repeaters which are transmitting the spacing signals toward the hub, are operated to the spacing condition. The reception of a spacing signal by a distant telegraph station which is transmitting toward the hub serves as an indication that more than one station is transmitting toward the hub simultaneously.

Now, in detail, for the marking condition, each receiving relay in the system, such as relay R, and each sending relay in the system, such as relay S, will have its armature actuated to engage with its right-hand or marking contact M, as shown. The armature of each relay R will be actuated to engage its marking contact as a result of the net magnetic effect of the current in its two windings, not shown, in a well-known manner. The armature of each relay S will be actuated to engage its right-hand or marking contact as its associated sending tube 7 is activated for this condition, in a manner to be explained, under which condition the potential of junction point 11, between the cathodes of the send tube 7 and resistance 12, the lower terminal of which is connected to negative battery, will be positive, and the effect of current flowing from positive battery at junction 11 through the winding of each sending relay S to ground will actuate its respective armature to engage its right-hand or marking contact, as shown.

Neglecting for the present the condition of the control circuit associated with the hub repeater which, it is assumed, last transmitted toward the hub, which will be considered hereinafter, since each receiving relay such as R is assumed to be in the marking condition, positive battery is connected through each marking contact, resistance such as 15, dry rectifier such as 16 and the respective receiving leg 1 of each repeater to the hub 2 and junction 8 of the hub potentiometer formed by resistances 9 and 10, which are connected in series between battery and ground. The magnitudes of the positive potential impressed on junction 8 and of the positive potential of the battery connected to each marking contact M of each receiving relay are such that no current flows through dry rectifier 16 in any receiving leg for this condition.

It will be assumed that the regenerative repeater is connected in the hub lead. The positive potential impressed on junction point 8 is impressed on the sending hub 4 through switch 5 and the regenerative repeater. From the sending hub 4 the positive potential for the marking condition is impressed through each sending leg 6 and resistance 37 between the two parallel grids and cathodes of each of the triodes comprising the sending tube 7. The two cathodes of these triodes are connected in parallel to junction 11 where parallel branches are formed. One branch extends through resistance 12 to negative battery. The other extends through the winding of polar sending relay S to ground.

It will be observed that the potential which is impressed on the grids of triodes 7 will be affected by the condition of the left-hand or hold triode of double triode 14, depending upon whether the left-hand triode be activated or inactivated. For reasons which will be made clear hereinafter the hold triode in the control circuits of all hub repeaters connected into the concentration, except that one in the hub repeater which last transmitted a spacing signal toward the hub, will be inactivated for this condition and the potential impressed on the input of triode 7 will be due to that of the positive marking hub potentiometer alone, as the inactivated hold triode will be without effect. Since positive hub potential alone is impressed through resistance 37 between the grids and cathodes of double triode 7, double triode 7 will be activated and a circuit will be established from positive battery through resistance 38 from the anodes to the cathodes of the double triode 7 and through resistance 12 to negative battery. The magnitudes of the batteries and of the resistances are so chosen that the potential of junction 11 is positive and current therefore flows from a point of positive potential through the winding of sending relay S to ground actuating its armature to engage its right-hand or marking contact.

Now, to consider the operation of the control circuit. First those control circuits in all hub repeaters, other than the last one which transmitted toward the hub, will be considered. In such repeaters for the marking condition positive battery is impressed through the marking contact and armature of each receiving relay R through resistances 17 and 18 to negative battery. The cathode of the left-hand triode of the double triode or flip-flop tube 13 is connected to the junction between resistances 17 and 18. From receiving leg 1, which is at positive marking hub potential, a circuit extends through resistances 19 and 20 to negative battery. The grid of the left-hand triode is connected to the junction between resistances 19 and 20. The potentials of the marking contact M and of the hub are both positive and their magnitudes together with those of the negative battery and the magnitudes of resistances 17, 18, 19 and 20 are so chosen that for this condition the grid of the left-hand triode of double triode 13 is sufficiently negative with respect to the cathode that the left-hand triode does not conduct.

A circuit may be traced from positive battery through resistances 21, 24 and 27 to negative battery. The grid of the right-hand triode of double triode 13 is connected to the junction between resistances 24 and 27. The cathode of this triode is connected to the junction between resistances 25 and 26, which latter are connected in series between negative battery and ground. With the left-hand triode of double triode 13 cut off, the potential of the grid of the right-hand triode is sufficiently positive with respect to its cathode that the right-hand triode is activated. A circuit may also be traced from positive battery through resistances 23 and 22 to the grid of the left-hand triode of double triode 13. When the right-hand triode of double triode 13 is activated the potential at its anode is lowered and the lowered potential is impressed through resistance 22 on the grid of the left-hand triode. The reason for this will be made clear hereinafter.

A circuit may also be traced from positive battery through resistances 23, 29 and 30 to negative battery. The grid of the left-hand or hold triode of double triode 14 is connected to the junction between resistances 29 and 30. When the right-hand triode of double triode 13 is activated, the potential impressed between the grid and cathode of the left-hand or hold triode of double triode 14 is lowered and the hold triode is cut off. As a result of this the potential impressed on the grids of send tube 7 is due to that of the hub alone since the path through the hold tube is substantially open circuited.

If now the armature of the receiving relay, such as relay R, of a single hub repeater is actuated to spacing to send a spacing signal toward the hub, negative battery is impressed on the top terminal of resistance 17 and the cathode of the left-hand triode becomes more negative. The dry rectifier 16 is so poled that current flows from the hub through the dry rectifier 16 and resistance 15 for this condition and the hub becomes negative. But the grid of the left-hand triode of double triode 13 is positive with respect to the cathode of the left-hand triode and this triode conducts. The lowered anode potential of this triode impressed through resistance 24 on the grid of the right-hand triode cuts off the right-hand triode of double triode 13. This raises the potential applied to the grid of the hold triode through resistance 29 and the hold triode conducts. This in turn makes the potential of junction 40 and of the grids of the send tube 7 more positive. And this effect is dominant over the effect of the negative potential of the hub, so that send tube 7 is maintained activated and sending relay S is maintained on marking.

It is particularly pointed out that the condition just described applies only to the single hub repeater which is sending toward the hub, and the hold tube in this one repeater will be activated to maintain its associated send relay S on marking so that the spacing signal may not be returned to the originating source.

In the case of all other hub repeaters, the condition of the double triode 13 and of the hold triode in all such repeaters remains as heretofore described for the marking condition which means that the hold triode will be without effect on the negative potential spacing signal condition which will be impressed through the sending legs of such repeaters to cut off their respective sending tubes 7. In response to this junction 11 becomes negative and the armatures of the associated sending relays are actuated to engage their respective spacing contacts to propagate the spacing signal to all connected repeaters.

By a proper choice of constants the potential of junction 11 may be made of equal magnitude positive and negative for the marking and spacing conditions so that polar signals may be transmitted from sending relays S to the distant repeaters.

To return now to the single hub repeater which is transmitting toward the hub, it will be recalled that in response to the first spacing signal element, the left-hand triode of its double triode 13 was activated and the associated right-hand triode was cut off. When this right-hand triode is cut off, a raised positive potential is applied through resistance 22 on the grid of the left-hand triode of double triode 13. When in response to the next marking signal element the armature of receiving relay R impresses positive potential on the top terminal of resistance 17, returning its connected cathode to its original potential, the associated grid will be maintained sufficiently positive with respect thereto that the left-hand triode of double triode 13 will remain activated, to maintain the hold condition in the control circuit, thus maintaining the send relay S in this particular repeater marking while this particular repeater continues to transmit toward the hub. This is of importance only when the regenerative repeater is connected in circuit, which results in a delay equal to the duration of approximately one-half a signal element, as is well understood in the art, between the reception and the retransmission of the signals by the regenerative repeater. If the hold were applied simultaneously with the beginning of reception of a spacing signal element and the retransmission of a regenerated spacing signal element were delayed by the regenerative repeater in order that the middle portion of a signal element might be sensed to determine its nature before regeneration, as is the case, and then the hold was removed instantly by the control circuit at the beginning of reception of the next succeeding marking signal element, approximately one-half of a spacing signal element, that is the tail of each spacing signal element which preceded a transition to marking, would pass through the sending leg of the repeater from which the signals were being received.

Now the operation of the circuit for the double space condition will be described.

As mentioned in the foregoing when more than one spacing signal is impressed on the hub simultaneously, a spacing signal is required to be transmitted from every S relay in every repeater including the S relays in the repeaters whose associated R relays are transmitting the spacing signals toward the hub. In order to do this it is necessary to condition all control circuits so that no hold is applied so that the spacing signal being applied to the hub may pass through all sending legs.

The grid of the right-hand or double space triode of double triode 14 in each control circuit is connected through a resistance such as 33 and its respective receiving leg 1 to the receiving hub 2. The cathode is connected to the junction 41 in a potentiometer circuit extending from negative battery through resistances 34 and 35 to ground. For both the marking and single space conditions each grid is positive with respect to its cathode so that the double space triode in each control circuit conducts. A circuit may be traced from positive battery through a resistance such as resistance 32 to the anode of each double space triode and from the anode through a resistance such as resistance 28 to the grid of the corresponding right-hand triode of the double or flip-flop triode 13. When the double space triodes are activated, a lowered potential will be impressed through resistances such as resistance 28 on the grids of the right-hand triodes of the double triodes 13, which lowered potential will be without effect on the condition of these triodes. When more than one spacing signal is impressed on the hub the grid of each double space triode is made sufficiently negative with respect to its cathode that each double space triode is inactivated raising the potential applied through each resistance 28 to each grid of each right-hand triode of double triode 13 and activating it. In response to this the lowered potential applied through each resistance 29 cuts off each hold triode and negative potential due to the plural spacing signals passes through each sending leg so that a spacing signal is transmitted from each sending relay in the hub concentration. Since, when a single receiving relay transmits toward the hub its associated sending relay is maintained in the marking condition as heretofore explained, the reception of a spacing signal by a station which is transmitting indicates to the attendant thereat that more than one station is attempting to transmit. Whether this is due to a break or to inadvertently attempted simultaneous transmission, the transmitting stations respond by ceasing to transmit.

What is claimed is:

1. In a telegraph repeater system, a plurality of hub type telegraph repeaters each having an individual receiving leg and an individual sending leg connected to a common hub, a control circuit in each repeater interconnecting the respective receiving and sending legs in each repeater, potential discriminating means in each said control circuit, said means connected individually to its respective associated receiving leg and to said hub, said means connected individually to the input circuit of a space discharge hold tube in each said control circuit for controlling the passage of telegraph signals from said hub through the particular sending leg to which any control circuit is connected, a cathode in each said tube, and a conductor connecting said cathode directly to its respective sending leg.

2. In a hub type telegraph repeater system, a common hub connected to a plurality of hub type repeaters each having an individual sending leg, each of said hub repeaters having therein an individual control circuit, each of said control circuits having therein an individual hold tube, each of said hold tubes having a cathode directly connected to its associated individual sending leg, to control transmission through its associated sending leg, said cathode being substantially open-circuited for one signaling condition through said leg to prevent shunting said leg, an individual receiving leg in each of said repeaters connected to said hub and potential discriminating means in each of said control circuits, each of said means connected to its individual receiving leg, to said common hub, and to its individual hold tube.

3. A hub type telegraph repeater having a receiving leg and a sending leg connected to a common hub, a control circuit interconnecting said legs in said repeater, said control circuit having two space discharge devices interconnected to form a flip-flop circuit, a space discharge double space tube and a space discharge hold tube, the input of said hold tube having a control connection from the output of said flip-flop circuit, the output of said double space tube having a control connection to an input of one of said tubes in said flip-flop circuit, and a cathode on said hold tube directly connected to said sending leg to control transmission through said sending leg while presenting a substantially open circuit for one signaling condition through said leg.

4. In a hub type telegraph repeater, in combination, a hub, a sending leg connected thereto, a sending space discharge tube connected in said leg, a cathode in said tube, a resistance connected between negative battery and said cathode, a sending polar relay having a winding connected between ground and the junction of said resistance and said cathode, a control circuit having a hold tube, and a cathode in said hold tube connected directly to said sending leg, to control transmission through said sending leg and to prevent shunting said sending leg during one signaling condition by presenting a substantially open circuit to said sending leg.

5. In a hub type telegraph repeater, a control circuit having a hold tube, a cathode in said tube, a hub, a sending leg, a sending tube, a grid on said sending tube, a first connection extending from said hub through a lumped resistance to said grid and a second connection extending from said cathode directly to said grid.

WILTON T. REA.

REFERENCES CITED

The following references are of record in the file of this patent:

UNITED STATES PATENTS

| Number | Name | Date |
|---|---|---|
| 2,392,339 | Rea | Jan. 8, 1946 |
| 2,553,978 | Neiswinter | May 22, 1951 |